(No Model.) 2 Sheets—Sheet 1.

M. MOSKOWITZ.
ELECTRIC SWITCH.

No. 571,952. Patented Nov. 24, 1896.

WITNESSES:
Wm. H. Canfield Jr.
Marcy J. Drisdell

INVENTOR:
MORRIS MOSKOWITZ,
BY
Fred C. Fraentzel,
ATTORNEY (No Model.) 2 Sheets—Sheet 2.
M. MOSKOWITZ.
ELECTRIC SWITCH.

No. 571,952. Patented Nov. 24, 1896.

WITNESSES:

INVENTOR:
MORRIS MOSKOWITZ,
BY
Fred C. Fraentzel,
ATTORNEY

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

ELECTRIC SWITCH.

SPECIFICATION forming part of Letters Patent No. 571,952, dated November 24, 1896.

Application filed June 11, 1896. Serial No. 595,105. (No model.)

*To all whom it may concern:*

Be it known that I, MORRIS MOSKOWITZ, a citizen of the United States, residing at Newark, in the county of Essex and State of New Jersey, have invented certain new and useful Improvements in Electric Switches; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

My present invention relates more particularly to improvements in electric switches to be used for completing a circuit between a dynamo and secondary battery while charging the latter, the construction being such, however, as to automatically open the circuit when the voltage of the dynamo is lower than that of the battery.

The object of the invention therefore is to provide an electric switch which is sensitive and very positive in its action, its construction being such as to prevent a reversal of the current through the dynamo, with disastrous effects, when the voltage of the dynamo falls lower than that of the battery.

The invention therefore consists in the novel construction of switch herein set forth, and also in the arrangement and combination of such switch with other electrical apparatus and their circuit connections, such as will be hereinafter fully described and finally embodied in the clauses of the claim.

Figure 1:
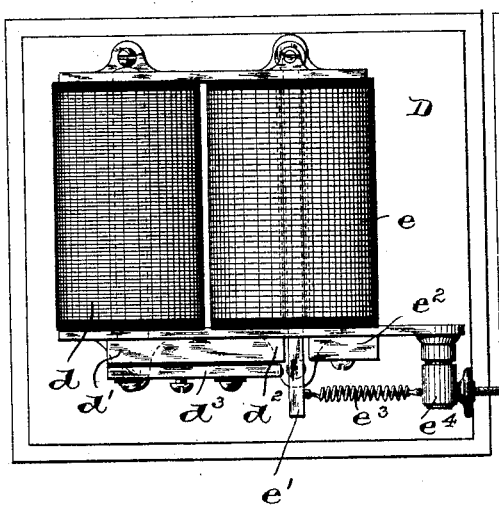
Figure 2:
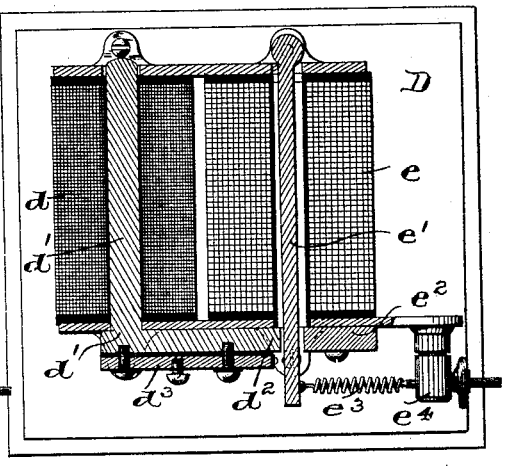
Figure 3:
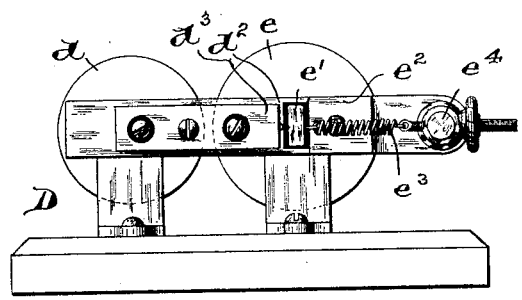
Figure 4:
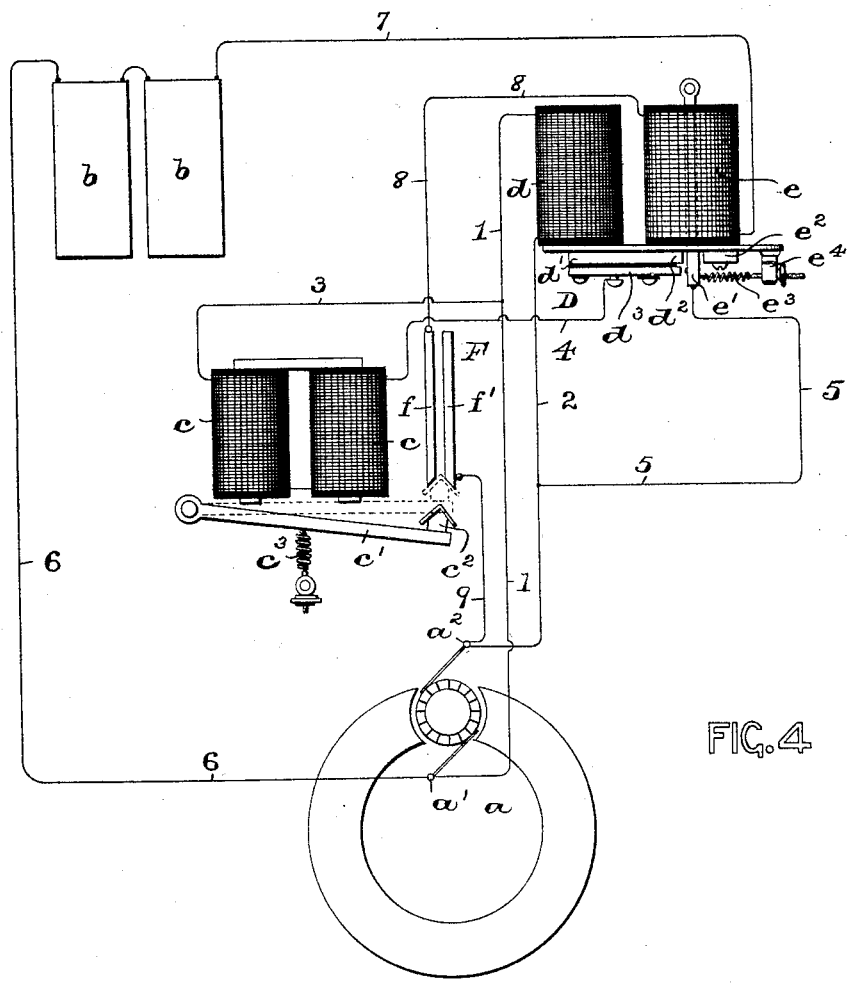

Referring to the accompanying drawings, in which like letters and numerals of reference indicate corresponding parts in each of the several views, Figure 1 is a face or front view of my novel form of electric switch. Fig. 2 is a vertical section of the same, and Fig. 3 is an end view of the same. Fig. 4 is a diagrammatic view of a dynamo, a pair of electromagnets, a secondary battery, my novel construction of switch, and the circuit connections connecting the several apparatus electrically.

In said drawings, $a$ indicates any suitable form of dynamo.

$b\ b$ are a pair of secondary batteries, $c\ c$ a pair of electromagnets, and D is my novel construction of electric switch. This switch, which is more clearly illustrated in Figs. 1, 2, and 3, comprises therein a single-pole shunt-magnet $d$ and an electromagnet $e$. As will be seen from said Fig. 1, said magnet $d$ is connected in shunt with the terminals $a'$ and $a^2$ of the dynamo $a$ by means of the circuit-wires 1 and 2. As soon as the dynamo $a$ has obtained a certain speed, and consequently a certain electromotive force, the said shunt-magnet will become energized and draw the small armature $e'$ toward its magnetic core $d'$, causing it to make electrical contact at $d^2$ and in that way complete a circuit through the pair of magnets $c\ c$, the wire 3 connecting one of said magnets with the wire 1, the wire 4 through an insulated metallic plate or bar $d^3$, the said armature $e'$, the wire 5 connected therewith, and the wire 2, as will be clearly evident. Thus it will be seen that the said magnets $c\ c$ are also connected across the terminals of the dynamo $a$, but they are subject to the actions of the electromagnet $d$ before any current can pass through them. From the terminal $a'$ of the dynamo $a$ extend the circuit-wires 6 7, in which I have arranged the secondary batteries $b\ b$, said wire 7 connecting with the electromagnet $e$. A wire 8 from said magnet $e$ connects with the contact-bar $f$ of the contact device F, and connecting a second contact-bar $f'$ of said device with the terminal $a^2$ of the dynamo is a wire 9. The said magnets $c\ c$ are provided with a spring-actuated armature-bar $c'$, having the contact $c^2$, adapted to make electrical contact between the bars $f$ and $f'$ when the magnets $c\ c$ are energized and have established a complete circuit through the wire 6, batteries $b\ b$, wire 7, magnet $e$, wire 8, device F, wire 9, and the dynamo $a$, as will be clearly understood. The armature $e'$ of the magnet $e$ is connected by means of a spring $e^3$ with a post $e^4$, and $e^2$ is a soft piece of iron which is used for the purpose to be more fully set forth hereinafter.

The operation of the device is as follows: Suppose the several parts of the electromagnet $d$ have been adjusted for a pressure of forty volts and the dynamo is started and increases in speed until it justifies an output of forty volts. Then when this point is reached the shunt-magnet $d$ attracts the armature $e'$ of the magnet $e$ and immediately completes the circuit through the pair of magnets $c\ c$, which is caused by said armature $e'$ making contact with the metallic bar $d^3$ in the manner hereinabove stated, completing the circuit directly across the terminals of the dynamo $a$. Said electromagnets $c$ now being energized from the dynamo, they immediately attract their own armature $c'$ against the tension of the spring $c^3$, and the part $c^2$ of said armature making contact with the contact-bars $f$ and $f'$ of the device F the main circuit between the dynamo, the battery, and the electromagnet $e$ is closed, which can be readily traced by following the circuit-wires 6 7 8 9. Now when the speed of the dynamo, and, in consequence thereof, its electromotive force, falls to a pressure lower than that of the battery $b$ which it has been charging the action is as follows: The voltage of the battery being more powerful than that of the dynamo, the current will immediately tend to flow in the opposite direction from the battery to the dynamo; but when this takes place the electromagnet $e$, which is in series with the battery and the dynamo, is naturally affected by such a reversal of the current, and the armature $e'$ is consequently polarized in the opposite manner from which it was previously polarized. The result is that the armature $e'$ and the iron pole-piece $d'$ are suddenly of a like polarity, and on that account they instantly repel each other. In doing so it is self-evident that the circuit of the electromagnets $c\ c$ is broken by the parting of the armature $e'$ and the pole-piece $d'$, and the spring $c^2$, connected with the armature $c'$ of the electromagnets $c\ c$, will cause said armature $c'$ to be drawn down, whereby the main circuit between the battery, the electromagnet $e$, and the dynamo is broken without any ill effects to the latter. I have found, however, that when the current or rather the electromotive force of the dynamo has reached a point when the forces of current in the dynamo and the battery are equal in opposing each other, and that of the dynamo falls a fraction lower, the result will be that the armature $e$ sets up a series of vibrations, causing the armature of the electromagnets $c\ c$ to vibrate in unison with the armature $e'$. This result is very disastrous, as the heavy current is broken through the large switch connected with the electromagnets $c\ c$, and to overcome this objectionable feature I have provided the electromagnet $e$ with a small shoe $e^2$, of very soft iron. This shoe will immediately attract the armature $e'$, when the repulsion between said armature $e'$ and the pole-piece $d'$ takes place, and firmly hold said armature $e'$ against the shoe $e^2$, thereby making the apparatus absolutely positive in its functions and operative and practicable under the most severe conditions, thereby overcoming all danger of the current passing in an opposite direction through the dynamo and destroying the usefulness of said apparatus.

From the above description it will be readily evident that my present invention is especially adapted to systems for lighting railway-trains by electricity generated from a dynamo operated from a car-wheel axle in which the dynamo-armature is subject to variable speed, but the operation of the several parts hereinabove set forth need not be further described here in connection with a dynamo when used in this manner, it being my intention and purpose to use my present invention in any system of electrical wiring and appliances arranged therein to which it is applicable.

Having thus described my invention, what I claim is—

1. The herein-described electric switch, comprising therein, an electromagnet $d$ having a pole-piece $d'$, an electromagnet $e$, having an armature $e'$ and a soft-iron shoe $e^2$ secured to the said magnet $e$, so that said armature $e'$ is movably arranged between the ends of said pole-pieces $d'$ and said shoe $e^2$, substantially as and for the purposes set forth.

2. The herein-described electric switch, comprising therein, an electromagnet $d$ having a pole-piece $d'$, an electromagnet $e$, having an armature $e'$, and a soft-iron shoe $e^2$ secured to the said magnet $e$, so that said armature $e'$ is movably arranged between the ends of said pole-piece $d'$ and said shoe $e^2$, and a metallic bar $d^3$ secured to said pole-piece $d'$, substantially as and for the purposes set forth.

3. The combination, with a dynamo, secondary battery, a pair of electromagnets and their armature, a contact device and the respective circuit connection, of a switch D, comprising therein, an electromagnet $d$, in shunt with the dynamo, and having a pole-piece $d'$, an electromagnet $e$ in series with the dynamo and battery, having an armature $e'$, and a soft-iron shoe $e^2$ secured to said magnet $e$, so that said armature $e'$ is movably arranged between the ends of said pole-piece $d'$ and said shoe $e^2$, substantially as and for the purposes set forth.

4. The combination, with a dynamo, secondary battery, a pair of electromagnets and their armature, a contact device and respective circuit connections, of a switch D, comprising therein, an electromagnet $d$, in shunt with the dynamo, and having a pole-piece $d'$, an electromagnet $e$ in series with the dynamo and battery, having an armature $e'$, and a soft-iron shoe $e^2$ secured to said magnet $e$, so that said armature $e'$ is movably arranged between the ends of said pole-piece $d'$ and said shoe $e^2$, and a metallic bar $d^3$ secured to said pole-piece $d'$, substantially as and for the purposes set forth.

In testimony that I claim the invention set forth above I have hereunto set my hand this 2d day of June, 1896.

MORRIS MOSKOWITZ.

Witnesses:
LEON D. ADLER,
FREDK. C. FRAENTZEL.